(12) United States Patent
Han et al.

(10) Patent No.: US 12,132,711 B2
(45) Date of Patent: Oct. 29, 2024

(54) PRIVACY PROTECTION METHOD AND SYSTEM FOR FINANCIAL DATA SHARING BASED ON FEDERATED LEARNING

(71) Applicants: Zhejiang University City College, Hangzhou (CN); Zhejiang Gongshang University, Hangzhou (CN); Beihang Hangzhou Innovation Institute Yuhang, Hangzhou (CN)

(72) Inventors: Song Han, Hangzhou (CN); Siqi Ren, Hangzhou (CN); Minghui Wu, Hangzhou (CN); Shuai Zhao, Hangzhou (CN); Xiling Luo, Hangzhou (CN); Luyao Wang, Hangzhou (CN)

(73) Assignees: Zhejiang University City College, Hangzhou (CN); Zhejiang Gongshang University, Hangzhou (CN); Beihang Hangzhou Innovation Institute Yuhang, Hangzhou (CN)

( * ) Notice: Subject to any disclaimer, the term of this patent is extended or adjusted under 35 U.S.C. 154(b) by 252 days.

(21) Appl. No.: 17/941,451

(22) Filed: Sep. 9, 2022

(65) Prior Publication Data
US 2023/0328043 A1 Oct. 12, 2023

(30) Foreign Application Priority Data
Apr. 11, 2022 (CN) .......................... 202210372390.X

(51) Int. Cl.
*H04L 9/40* (2022.01)
*G06F 21/62* (2013.01)

(52) U.S. Cl.
CPC ...... *H04L 63/0428* (2013.01); *G06F 21/6245* (2013.01)

(58) Field of Classification Search
None
See application file for complete search history.

(56) References Cited

U.S. PATENT DOCUMENTS 11,218,293 B2 * 1/2022 Manamohan .......... G06N 3/006
11,829,239 B2 * 11/2023 Mitra .................. G06F 11/1004
(Continued)

FOREIGN PATENT DOCUMENTS

CN 114765625 A * 7/2022
CN 113435608 B * 5/2024 ............. G06N 20/20

OTHER PUBLICATIONS

Liu, Lumin et al., "Client-Edge-Cloud Hierarchical Federated Learning", arXiv:1905.06641v2, Oct. 31, 2019, 6 pages. (Year: 2019).*

*Primary Examiner* — Michael Pyzocha
(74) *Attorney, Agent, or Firm* — Hemisphere Law, PLLC; Zhigang Ma

(57) ABSTRACT

A privacy protection method and system for financial data sharing based on federated learning are provided. In recent years, due to the restrictions of data security and privacy protection laws and regulations, it is difficult to share data across institutions or departments. In order to make data transfer and transaction between different entities can be achieved without violating the national laws on data privacy and data security, the privacy protection method and system for financial data sharing based on federated learning is provided. A privacy collection intersection technology is adopted, so that two institutions, which may have many differences in business, but most of their customer groups are the same, jointly train a learning model.

10 Claims, 3 Drawing Sheets

(56) References Cited

U.S. PATENT DOCUMENTS

| | | | | |
|---|---|---|---|---|
| 2021/0143987 A1* | 5/2021 | Xu | ........................ | H04L 9/0819 |
| 2021/0174243 A1* | 6/2021 | Angel | ..................... | H04L 9/083 |
| 2022/0004932 A1* | 1/2022 | Gu | .......................... | G06F 30/27 |
| 2022/0398343 A1* | 12/2022 | Ou | .......................... | G06N 20/00 |
| 2022/0414661 A1* | 12/2022 | Hassanzadeh | ........... | G06N 3/04 |
| 2023/0017542 A1* | 1/2023 | Khisti | ..................... | H04L 9/085 |
| 2023/0025754 A1* | 1/2023 | Hassanzadeh | .......... | H04L 9/008 |
| 2023/0039182 A1* | 2/2023 | Cheng | .................... | G06N 3/098 |
| 2023/0073235 A1* | 3/2023 | Wang | ..................... | G06N 20/20 |
| 2023/0101308 A1* | 3/2023 | Amano | .................. | H04L 67/34 |
| | | | | 382/103 |
| 2023/0106706 A1* | 4/2023 | Fukuda | ................ | G06F 9/5061 |
| | | | | 706/15 |
| 2023/0140704 A1* | 5/2023 | Chen | ...................... | G06N 3/063 |
| | | | | 455/446 |
| 2023/0289473 A1* | 9/2023 | Arora | .................... | G06N 3/084 |
| 2023/0325529 A1* | 10/2023 | Sav | .................... | G06F 21/6245 |
| | | | | 726/26 |
| 2023/0342669 A1* | 10/2023 | Shao | ....................... | H04L 9/008 |
| 2024/0062072 A1* | 2/2024 | Wang | .................... | G06N 3/098 |

\* cited by examiner

PRIVACY PROTECTION METHOD AND SYSTEM FOR FINANCIAL DATA SHARING BASED ON FEDERATED LEARNING

TECHNICAL FIELD

The present disclosure relates to the field of financial data sharing and privacy protection, and in particularly, to a privacy protection method and system for financial data sharing based on federal learning.

DESCRIPTION OF RELATED ART

Since risk events such as data security and personal data privacy occur frequently, laws and regulations related to data regulation are issued, resulting in that a purpose of integrating isolated data from different organizations and departments for joint training and modeling is unable to be achieved. The emergence of federated learning provides a potentially feasible solution to the above purpose, and the federated learning enables data of each of participants to stay local and cannot be leaked. However, related studies have shown that data leakage occurs when only gradient parameters are uploaded. Therefore, for enhancing privacy protection, encrypted model gradient parameters will be uploaded in combination with a privacy computing method such as homomorphic encryption.

SUMMARY

The present disclosure is provided to solve the above problems existing in related art. Therefore, a privacy protection method and system for financial data sharing based on federated learning are required to solve problem of data island.

According to a first aspect of the present disclosure, a privacy protection method for financial data sharing based on federated learning is provided, including: step 1, sending by a cloud server initial global gradient parameters to at least two master servers, relaying by the at least two master servers the initial global gradient parameters to edge servers corresponding to the at least two master servers, and relaying by the edge servers the initial global gradient parameters to clients corresponding to the edge servers as local gradient parameters of the clients; step 2, obtaining by the clients public keys and private keys through key generation algorithms; step 3, training by the clients the local gradient parameters with local data to obtain trained local gradient parameters, encrypting by the clients the trained local gradient parameters with the public keys to obtain encrypted local gradient parameters, and sending by the clients the encrypted local gradient parameters to the edge servers; step 4, aggregating by the edge servers received encrypted local gradient parameters to obtain aggregated local gradient parameters, returning by the edge servers the aggregated local gradient parameters to the clients, and jointly decrypting by the clients the aggregated local gradient parameters with the private keys; step 5, aggregating and then sending by the edge servers the encrypted local gradient parameters obtained after iterations of a setting number of times on the clients to the at least two master servers for aggregation to thereby obtain aggregated parameters, sending by the at least two master servers the aggregated parameters to the cloud server, and aggregating by the cloud server the aggregated parameters received from the at least two master servers to generate new global gradient parameters.

According to another aspect of the present disclosure, a privacy protection system for financial data sharing based on federated learning is provided, including: a cloud server, configured to: send initial global gradient parameters to at least two master servers, receive parameters from each of the at least two master servers, and aggregate the received parameters to generate new global gradient parameters; the at least two master servers, configured to: receive the initial global gradient parameters from the cloud sever, send the initial global gradient parameters to edge servers, and receive and aggregate aggregated results from the edge servers; the edge servers, configured to: receive the initial global gradient parameters from the master servers, send the initial global gradient parameters to the clients as local gradient parameters, receive encrypted local gradient parameters from the clients, aggregate received encrypted local gradient parameters to obtain aggregated local gradient parameters, return the aggregated local gradient parameters to the clients, aggregate encrypted local gradient parameters obtained after iterations of a setting number of times on the clients to obtain the aggregated results, and send the aggregated results to the at least two master servers; and the clients, configured to: obtain public keys and private keys through a key generation algorithm, receive the initial global gradient parameters relayed from the edge servers, and iteratively perform the setting number of times of: training the local gradient parameters with the local data to obtain trained local gradient parameters, encrypting the trained local gradient parameters with the public keys to obtain the encrypted local gradient parameters, sending the encrypted local gradient parameters to the edge servers, receiving the aggregated local gradient parameters from the edge servers, and jointly decrypting the aggregated local gradient parameters with the private keys.

According to the privacy protection method and system for financial data sharing based on federated learning the present invention, at least two different financial institutions can use data of common users to jointly train a model, federated learning is used to ensure that the data of each participant of the at least two different financial institutions will not leave the local area, and multi-key homomorphic encryption is used for gradient parameters to ensure that there will be no leakage of gradient parameters.

DETAILED DESCRIPTION OF EMBODIMENTS

In order to better understand technical solutions of the present disclosure for the skilled in the art, the present disclosure will be described in detail hereinafter with reference to the drawings and specific embodiments. Embodiments of the present disclosure will be described in further detail below with reference to the drawings and specific examples, but not as a limitation of the present disclosure. If steps described in the following description are not necessarily related to each other, a corresponding order described herein exemplarily should not be regarded as a limitation. The skilled in the art should know that the corresponding order of the steps can be adjusted, as long as logic between the steps is not destroyed such that a whole process thereof cannot be realized.

Figure 1:
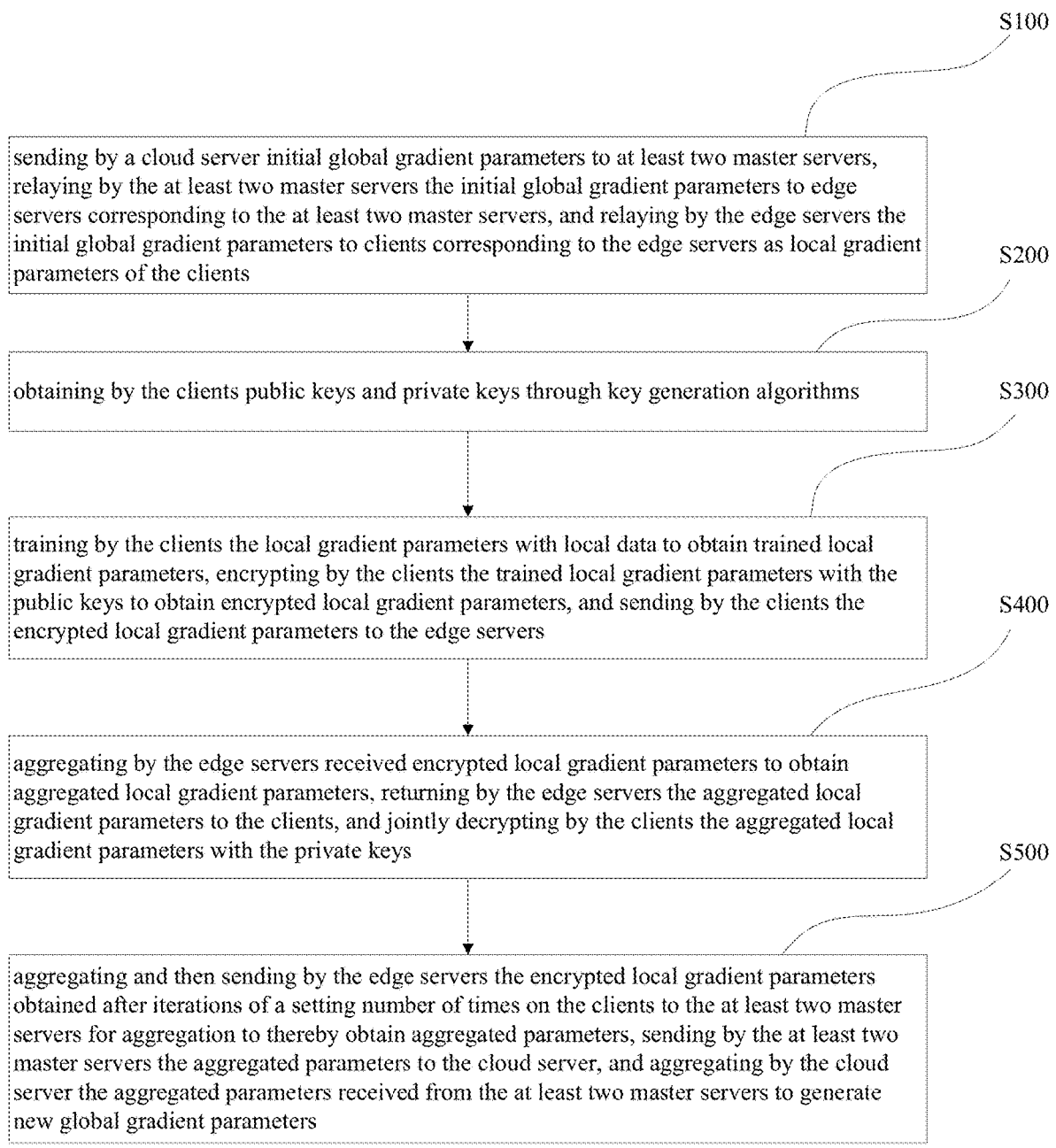
FIG. 1 illustrates a flowchart of a privacy protection method for financial data sharing based on federated learning according to an embodiment of the present disclosure.

FIG. 1 illustrates a flowchart of a privacy protection method for financial data sharing based on federated learning according to an embodiment of the present disclosure. The embodiment of the present disclosure provides a privacy protection method for financial data sharing based on federated learning. As shown in FIG. 1, the method starts with step S100. In the step S100, a cloud server sends initial global gradient parameters to at least two master servers, the at least two master servers relay the initial global gradient parameters to edge servers corresponding to the at least two master servers, and the edge servers then relay the initial global gradient parameters to clients corresponding to the edge servers as local gradient parameters of the clients. It is noted that the at least two master servers indicate master servers being greater than or equal to two. As an example merely, the at least two master servers may be two or more different financial institutions, and the two or more different financial institutions have different data; and with the method provided in the embodiment of the present disclosure, for the two or more financial institutions, each participant thereof can train a common learning model without exchanging data between the two or more financial institutions and under the condition of protecting user data and privacy security.

Further, it is noted that the initial global gradient parameters described herein are parameters of a model to be trained. If the model is trained for the first time, the initial global gradient parameters are parameters initialization of the model to be trained. As an example merely, the initial global gradient parameters at least include a learning rate, a local iteration number of client, an iteration number of edge sever, and security parameters for generating the public keys and the private keys.

In step S200, public keys and private keys are obtained by the clients through key generation algorithms.

In some embodiments, the clients encrypt the local gradient parameters using multi-key homomorphic encryption. Specifically, when the local gradient parameters are encrypted through the multi-key homomorphic encryption, only an additive operation is generally involved during aggregation of model parameters in federal learning, so a multi-key homomorphic encryption solution designed in the present disclosure can satisfy only an additive homomorphic encryption solution. In the multi-key homomorphic encryption solution, the security parameters are generated by the cloud server, and each of the clients participating in the training uses the security parameters to generate its own public keys and private keys.

In step S300, the clients train the local gradient parameters with local data to obtain trained local gradient parameters, encrypt the trained local gradient parameters with the public keys corresponding to the clients to obtain encrypted local gradient parameters, and sends the encrypted local gradient parameters to the edge servers corresponding to the clients. It should be noted that the local gradient parameters are received by the clients from the edge servers.

In step S400, the edge servers aggregate received encrypted local gradient parameters to obtain aggregated local gradient parameters, return the aggregated local gradient parameters to the clients, and the clients jointly decrypt the aggregated local gradient parameters with the private keys corresponding to the clients.

In some embodiments, the edge servers set thresholds of client receiving number respectively, and in response to numbers of the encrypted local gradient parameters sent to the respective edge servers reach the thresholds, the edge servers no longer receive encrypted local gradient parameter; and the edge servers aggregate the encrypted local gradient parameters have been received to obtain the aggregated local gradient parameters, the edge servers send the aggregated local gradient parameters to the clients corresponding to the edge servers, and the clients jointly decrypt the aggregated local gradient parameters with the private keys.

Finally, in step S500, the edge servers aggregate and then send the encrypted local gradient parameters obtained after iterations of a setting number of times on the clients to the at least two master servers for aggregation to thereby obtain aggregated parameters, the at least two master servers send the aggregated parameters to the cloud server, and the cloud server aggregates the aggregated parameters received from the at least two master servers to generate new global gradient parameters.

Figure 2:
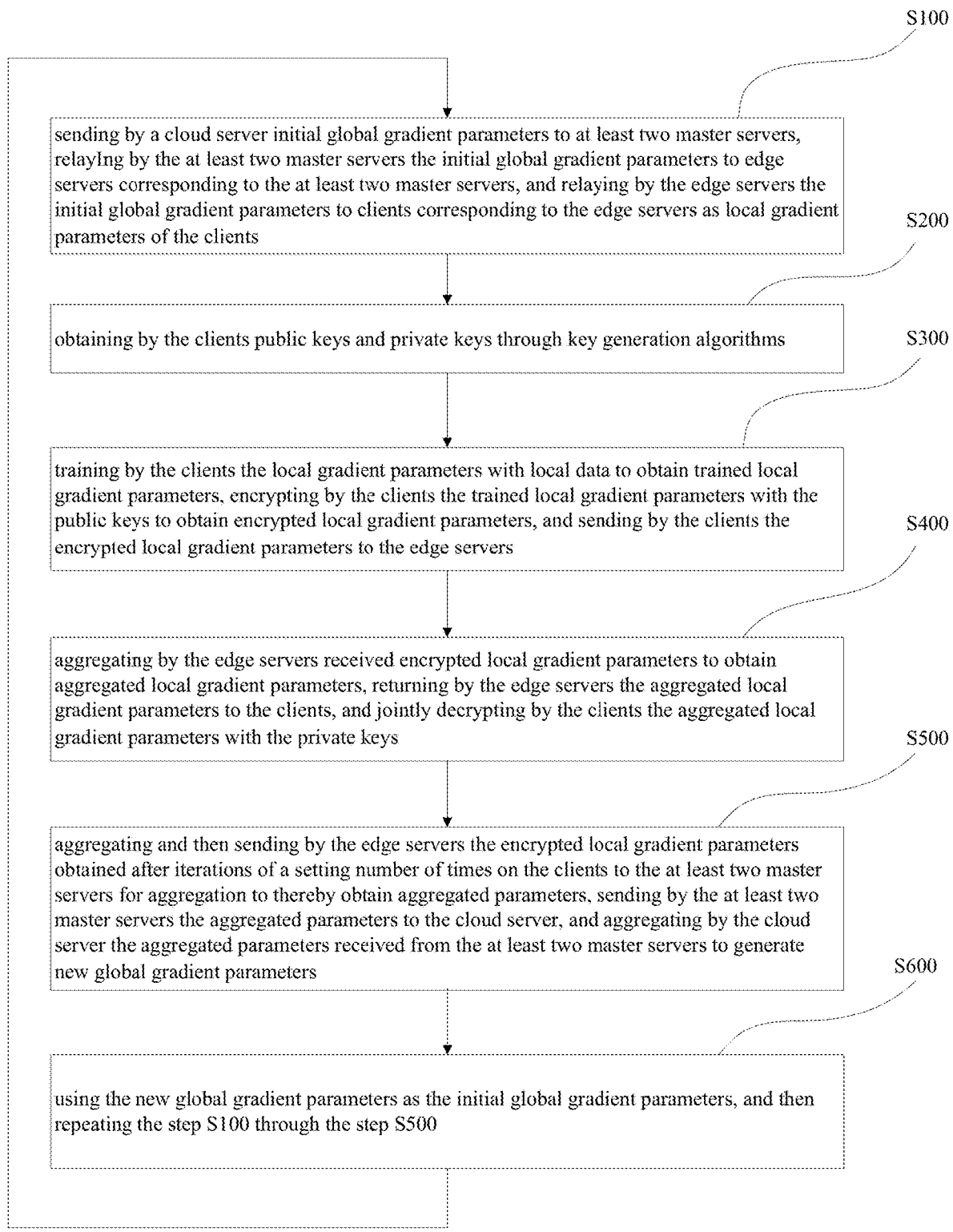
FIG. 2 illustrates a flowchart of another privacy protection method for financial data sharing based on federated learning according to an embodiment of the present disclosure

FIG. 2 illustrates a flowchart of another privacy protection method for financial data sharing based on federated learning according to an embodiment of the present disclosure. In some embodiments, as shown in FIG. 2, the method further includes step S600. In the step S600, the new global gradient parameters are used as the initial global gradient parameters and then steps S100 through S500 are repeated. The training effect of the model is thereby further improved. An execution time of the step S600 is determined according to actual training requirements, for example, the step S600 can be implemented once, twice, five times, eight times, etc., and the embodiment of the present disclosure is not specifically limited to this.

Figure 3:
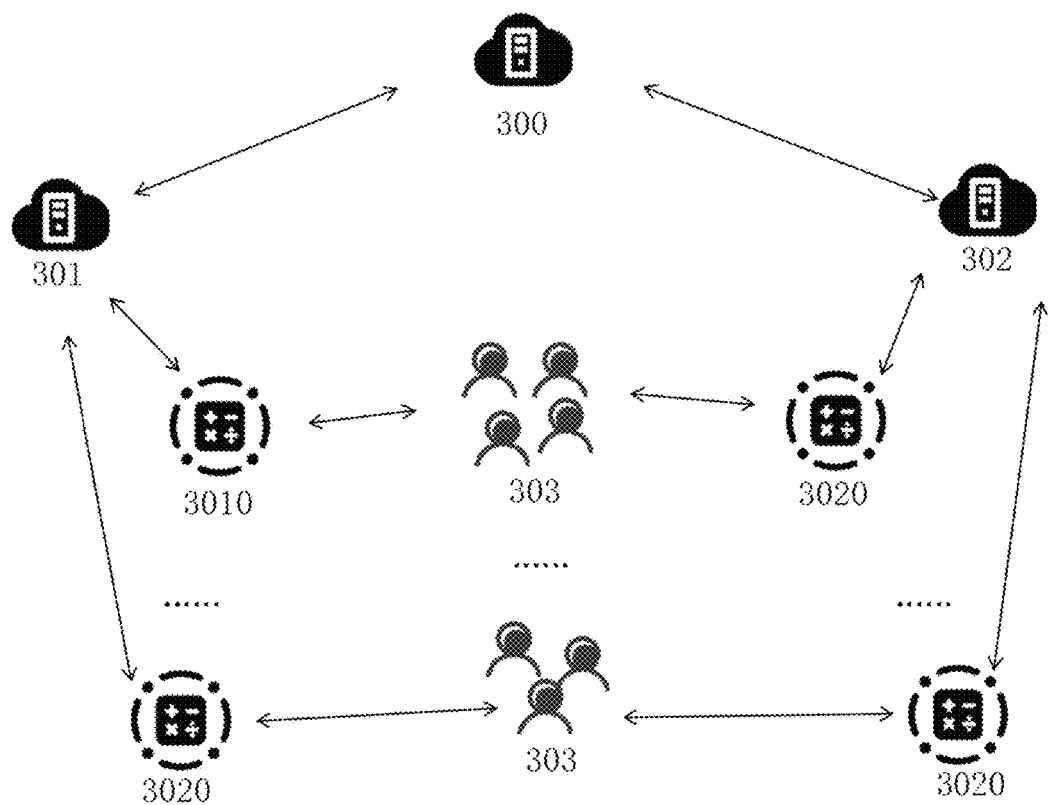
FIG. 3 illustrates an information interaction view of a privacy protection method for financial data sharing based on federated learning according to an embodiment of the present disclosure.

FIG. 3 illustrates an information interaction view of a privacy protection method for financial data sharing based on federated learning according to an embodiment of the present disclosure. As shown in FIG. 3, the cloud server 300 performs information interaction with two master servers 301 and 302. Specifically, the cloud server 300 sends initial global gradient parameters to the two master servers 301 and 302, and the two master servers 301 and 302 relay the initial global gradient parameters to their corresponding edge servers 3010 and 3020, and the edge servers 3010 and 3020 then relay the initial global gradient parameters to corresponding clients 303 as local gradient parameters of clients. The clients 303 use local data to train the local gradient parameters to obtain trained local gradient parameters, encrypt the trained local gradient parameters with corresponding public keys to obtain encrypted local gradient parameters, and send the encrypted local gradient parameters to corresponding edge servers 3010 and 3020. The edge servers 3010 and 3020 aggregate received encrypted local gradient parameters to obtain aggregated local gradient parameters and return the aggregated local gradient parameters to the corresponding clients 303, and the clients 303 jointly decrypt the aggregated local gradient parameters with corresponding private keys. The encrypted local gradient parameters obtained after iterations of a setting number of times on the clients are aggregated and sent by the edge servers 3010 and 3020 to obtain aggregated local gradient parameters, and the aggregated local gradient parameters are sent by the edge servers 3010 and 3020 to corresponding master servers 301 and 302 for aggregation; after aggregating by the corresponding master servers 301 and 302 to obtain aggregated parameters, and the aggregated parameters are sent by the corresponding master servers 301 and 302 to the cloud server 300, and the cloud server 300 aggregates the aggregated parameters received from the master servers 301 and 302 to generate new global gradient parameters. It should be noted that the clients 303 can be overlapping clients jointly owned by the two master servers 301 and 302 but with different services. Therefore, with the privacy protection method for financial data sharing based on federated learning according to an embodiment of the present disclosure, transfer and transaction of data between different entities are achieved without violating the national laws on data privacy and data security. In addition, the privacy protection intersection method can be used to make two institutions with most overlapping users, but very different businesses jointly train a model, so that the participants can train a common learning model under the condition of better protecting user data and privacy security.

Figure 4:
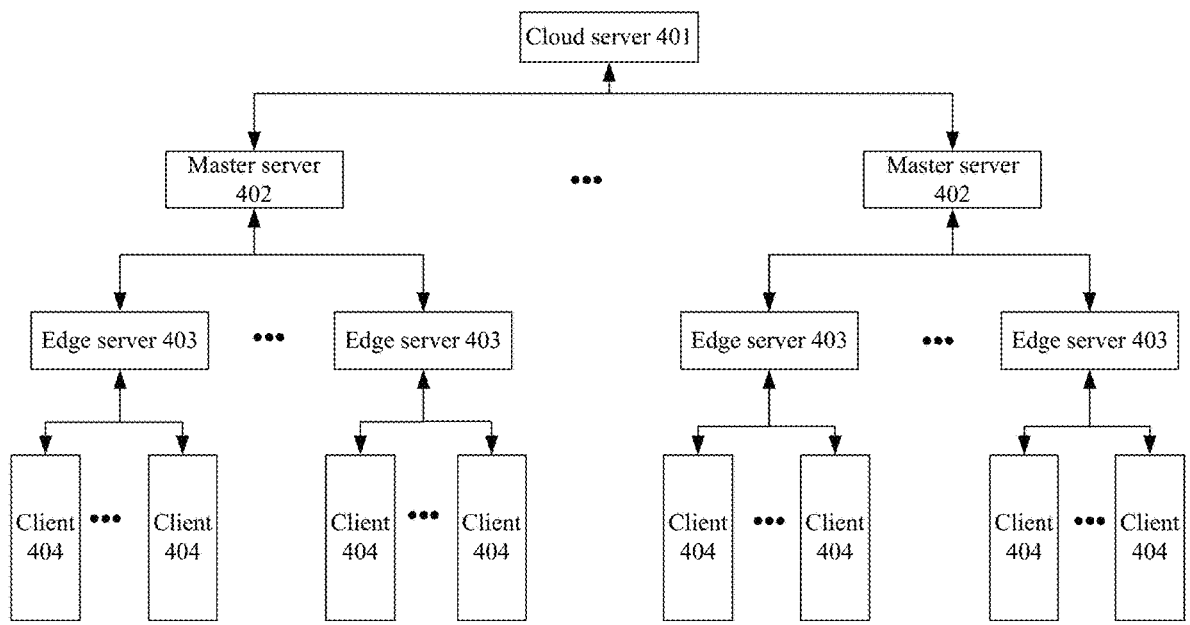
FIG. 4 illustrates a structural view of a privacy protection system for financial data sharing based on federated learning according to an embodiment of the present disclosure.

FIG. 4 illustrates a structural view of a privacy protection system for financial data sharing based on federated learning according to an embodiment of the present disclosure. The embodiment of the present disclosure also provide the privacy protection system for financial data sharing based on federated learning. As shown in FIG. 4, the system includes a cloud server 401, master servers 402, edge servers 403, and clients 404.

Specifically, the cloud server 401 is configured to: send initial global gradient parameters to at least two master servers 402, receive parameters from the at least two master servers 402, and aggregate the received parameters to generate new global gradient parameters. The at least two master servers 402 are configured to: receive the initial global gradient parameters from the cloud servers 401, send the initial global gradient parameters to the edge servers 403, and receive and aggregate aggregated results from the edge servers 403. The edge servers 403 are configured to: receive the initial global gradient parameters from the master servers 402 and send the initial global gradient parameters to the clients as local gradient parameter, receive encrypted local gradient parameters from the clients and aggregate received encrypted local gradient parameters to obtain aggregated local gradient parameters, return the aggregated local gradient parameters to the clients 404, aggregate encrypted local gradient parameters obtained after iterations of a setting number of times on the clients 404 to obtain the aggregated results and send the aggregated results to the master servers 402. The clients 404 are configured to: obtain public keys and private keys through key generation algorithms, receive the initial global gradient parameters relayed from the edge servers 403, and iteratively perform the setting number of times of: training the initial global gradient parameters with the local data to obtain trained local gradient parameters, encrypt the trained local gradient parameters with the public keys to obtain the encrypted local gradient parameters, send the encrypted local gradient parameters to the edge servers 403, receive the aggregated local gradient parameters from the edge server 403, jointly decrypt the aggregated local gradient parameters with the private keys.

In some embodiments, the initial global gradient parameters may include a learning rate, a local iteration number of client, an iteration number of edge sever, and security parameters for generating the public keys and the private keys.

In some embodiments, the clients may be further configured to encrypt the local gradient parameters through multi-key homomorphic encryption.

In some embodiments, the cloud server may be further configured to use the new global gradient parameters as the initial global gradient parameters.

In some embodiments, each of the edge servers may be further configured to: set thresholds of client receiving number; and in response to numbers of the encrypted local gradient parameters sent to the respective edge servers reach the thresholds, no longer receive encrypted local gradient parameter; and aggregate the encrypted local gradient parameters have been received to obtain the aggregated local gradient parameters, and send the aggregated local gradient parameters to the clients corresponding to the edge servers.

Beneficial effects of each of privacy protection systems for financial data sharing based on federated learning according to the embodiments of the present disclosure are substantially the same as that of the privacy protection methods for financial data sharing based on federated learning according to the embodiments of the present disclosure and will not be repeated herein.

The above description is intended to be illustrative but not limiting. For example, the above embodiments (or one or more solutions thereof) may be used in combination with each other. For example, the skilled in the art may use other embodiments when reading the above description. In addition, in the specific embodiments described above, various features may be grouped together to simplify the present disclosure. This should not be interpreted as an intent that features of the present disclosure not claimed for protection are necessary for any of the claims. Rather, the subject matters of the present disclosure may be less than a full range of features of a particular embodiment of the present disclosure. Therefore the following claims are incorporated herein as examples or embodiments in the specific embodiments, each of the claims can stand alone as a separate embodiment, and it is contemplated that these embodiments may be combined with each other in various combinations or arrangements. The scope of the present disclosure shall be determined by reference to the full scope of the appended claims and equivalent forms of these claim.

What is claimed is:

1. A privacy protection method for financial data sharing based on federated learning, comprising:

step 1, sending by a cloud server initial global gradient parameters to at least two master servers, relaying by the at least two master servers the initial global gradient parameters to edge servers corresponding to the at least two master servers, and relaying by the edge servers the initial global gradient parameters to clients corresponding to the edge servers as local gradient parameters of the clients;

step 2, obtaining by the clients public keys and private keys through key generation algorithms;

step 3, training by the clients the local gradient parameters with local data to obtain trained local gradient parameters, encrypting by the clients the trained local gradient parameters with the public keys to obtain encrypted local gradient parameters, and sending by the clients the encrypted local gradient parameters to the edge servers;

step 4, aggregating by the edge servers received encrypted local gradient parameters to obtain aggregated local gradient parameters, returning by the edge servers the aggregated local gradient parameters to the clients, and jointly decrypting by the clients the aggregated local gradient parameters with the private keys; and step 5, aggregating and then sending by the edge servers the encrypted local gradient parameters obtained after iterations of a setting number of times on the clients to the at least two master servers for aggregation to thereby obtain aggregated parameters, sending by the at least two master servers the aggregated parameters to the cloud server, and aggregating by the cloud server the aggregated parameters received from the at least two master servers to generate new global gradient parameters.

2. The method according to claim 1, wherein the initial global gradient parameters comprise: a learning rate, a local iteration number of client, an iteration number of edge sever, and security parameters for generating the public keys and the private keys.

3. The method according to claim 1, wherein the obtaining by the clients public keys and private keys through key generation algorithms specifically comprises:

encrypting by the clients the local gradient parameters through multi-key homomorphic encryption.

4. The method according to claim 1, further comprising:

using the new global gradient parameters as the initial global gradient parameters, and then repeating the step 1 through the step 5.

5. The method according to claim 1, wherein the aggregating by the edge servers received encrypted local gradient parameters to obtain aggregated local gradient parameters, returning by the edge servers the aggregated local gradient parameters to the clients, and jointly decrypting by the clients the aggregated local gradient parameters through the private keys specifically comprises:

setting thresholds of client receiving number by the respective edge servers; and in response to numbers of the encrypted local gradient parameters sent to the respective edge servers reach the thresholds, the edge servers no longer receiving encrypted local gradient parameter; and aggregating by the edge servers the encrypted local gradient parameters have been received to obtain the aggregated local gradient parameters, sending by the edge servers the aggregated local gradient parameters to the clients corresponding to the edge servers, and jointly decrypting by the clients the aggregated local gradient parameters with the private keys.

6. A privacy protection system for financial data sharing based on federated learning, comprising:

a cloud server, configured to: send initial global gradient parameters to at least two master servers, receive parameters from the at least two master servers, and aggregate received parameters to generate new global gradient parameters;

the at least two master servers, configured to: receive the initial global gradient parameters from the cloud sever, send the initial global gradient parameters to edge servers, and receive and aggregate aggregated results from the edge servers;

the edge servers, configured to: receive the initial global gradient parameters from the master servers, send the initial global gradient parameters to clients as local gradient parameters, receive encrypted local gradient parameters from the clients, aggregate received encrypted local gradient parameters to obtain aggregated local gradient parameters, return the aggregated local gradient parameters to the clients, aggregate encrypted local gradient parameters obtained after iterations of a setting number of times on the clients to obtain the aggregated results, and send the aggregated results to the at least two master servers; and the clients, configured to: obtain public keys and private keys through key generation algorithms, receive the initial global gradient parameters relayed from the edge servers, and iteratively perform the setting number of times of: training the local gradient parameters with local data to obtain trained local gradient parameters, encrypting the trained local gradient parameters with the public keys to obtain the encrypted local gradient parameters, sending the encrypted local gradient parameters to the edge servers, receiving the aggregated local gradient parameters from the edge servers, and jointly decrypting the aggregated local gradient parameters with the private keys.

7. The privacy protection system according to claim 6, wherein the initial global gradient parameters comprise: a learning rate, a local iteration number of client, an iteration number of edge sever, and security parameters for generating the public keys and the private keys.

8. The privacy protection system according to claim 6, wherein the clients are configured to:

encrypt the local gradient parameters through multi-key homomorphic encryption.

9. The privacy protection system according to claim 6, wherein the cloud server is further configured to:

use the new global gradient parameters as the initial global gradient parameters.

10. The privacy protection system according to claim 6, wherein the edge servers are configured to:

set thresholds of client receiving number; and in response to numbers of the encrypted local gradient parameters sent to the respective edge servers reach the thresholds, no longer receive encrypted local gradient parameter; and aggregate the encrypted local gradient parameters have been received to obtain the aggregated local gradient parameters, and send the aggregated local gradient parameters to the clients corresponding to the edge servers.

\* \* \* \* \*